Aug. 27, 1946.   I. JACOBSON ET AL   2,406,691
CAMERA AND LIGHT SYNCHRONIZER
Filed May 6, 1944   4 Sheets-Sheet 3
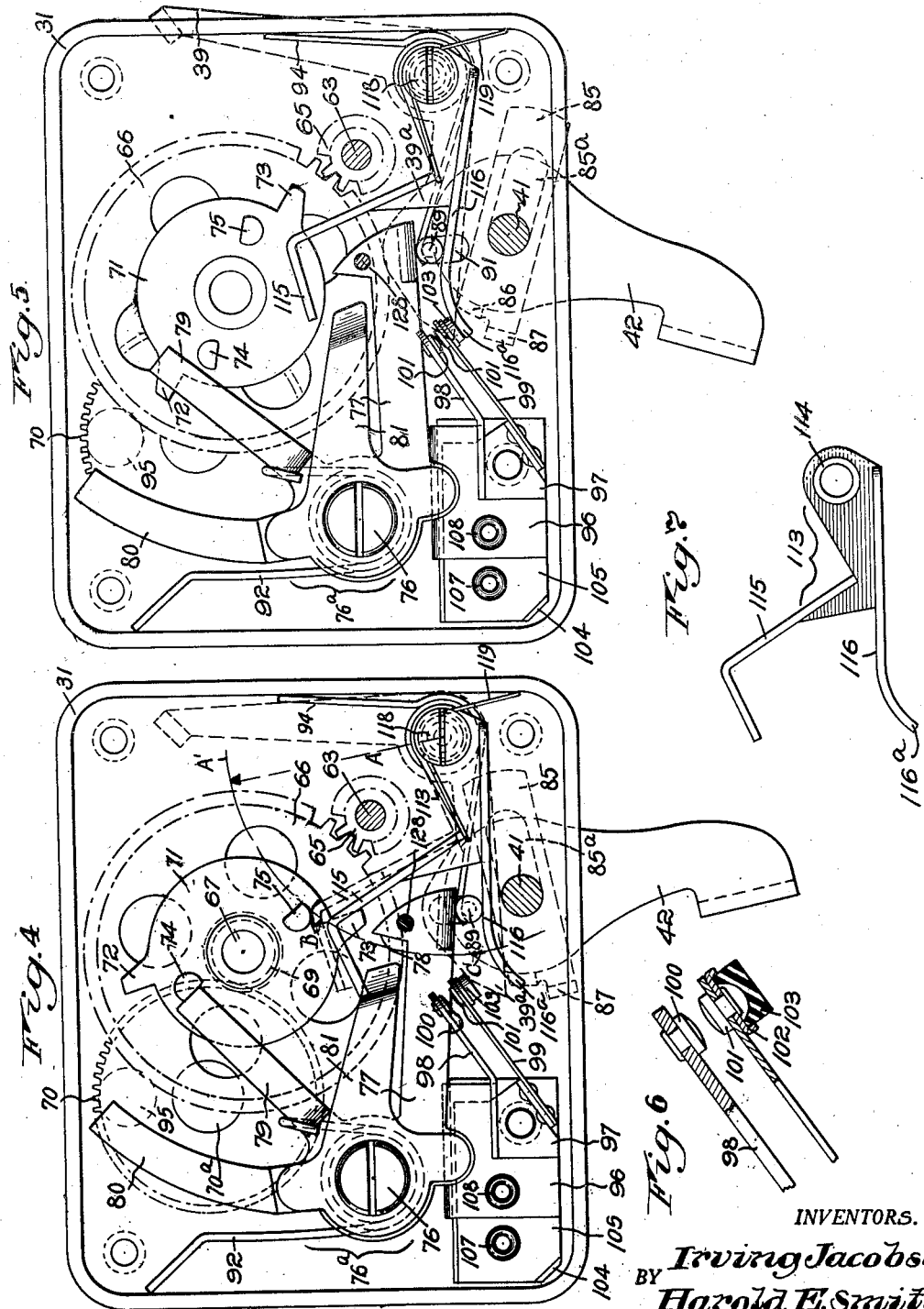
INVENTORS.
*Irving Jacobson*
BY *Harold E. Smith*
*Emery, Booth, Townsend, Miller and Jackson,* Att'ys

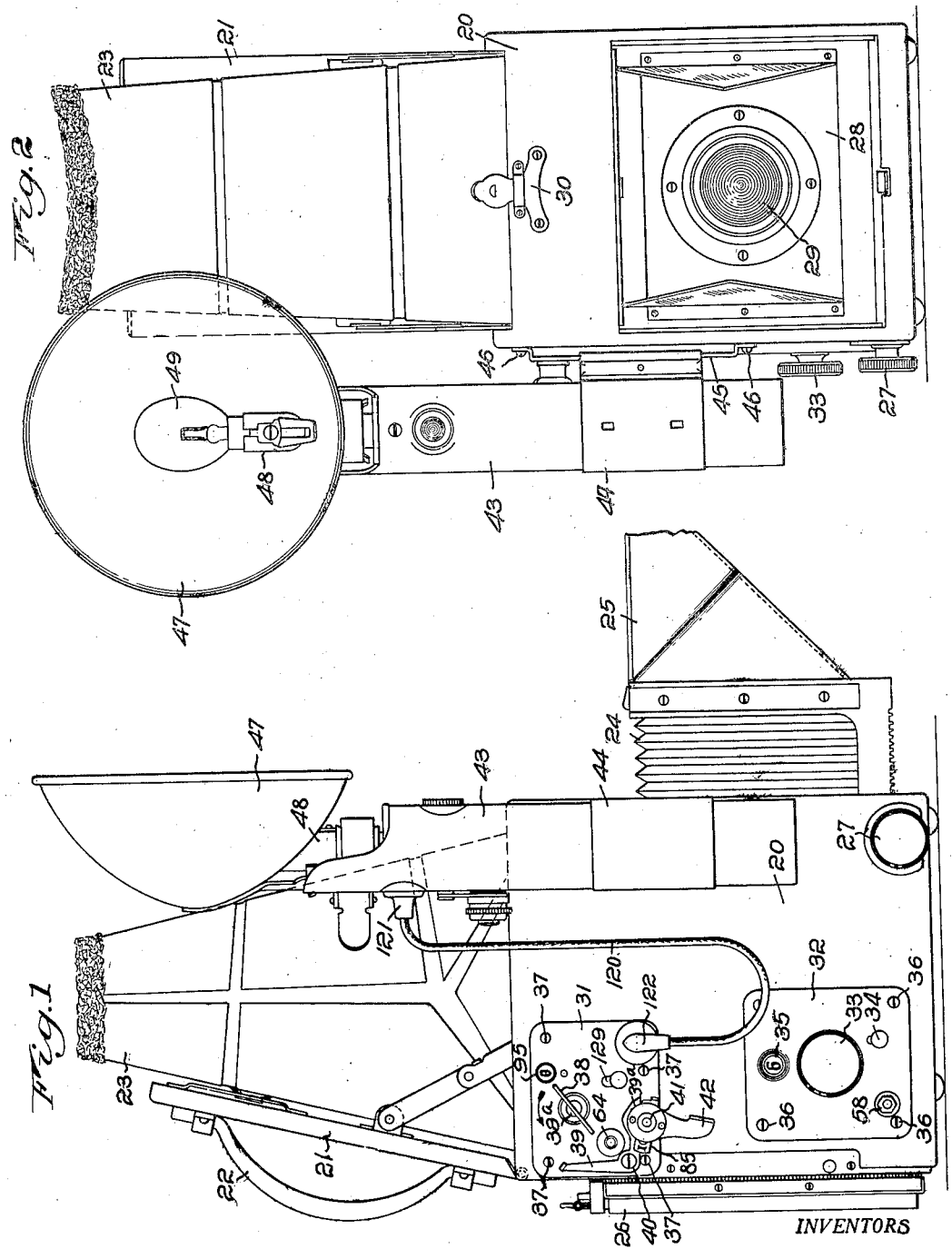

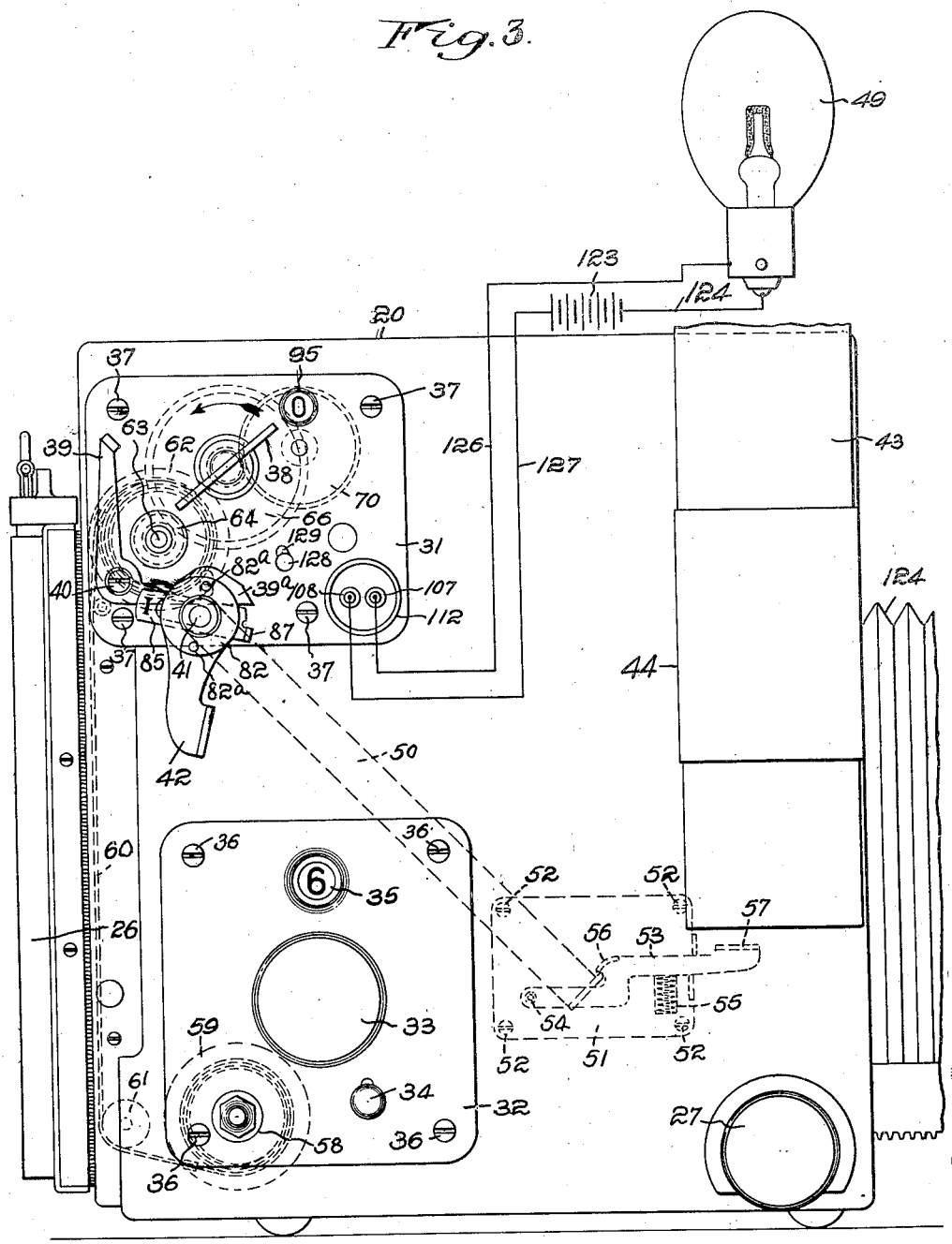

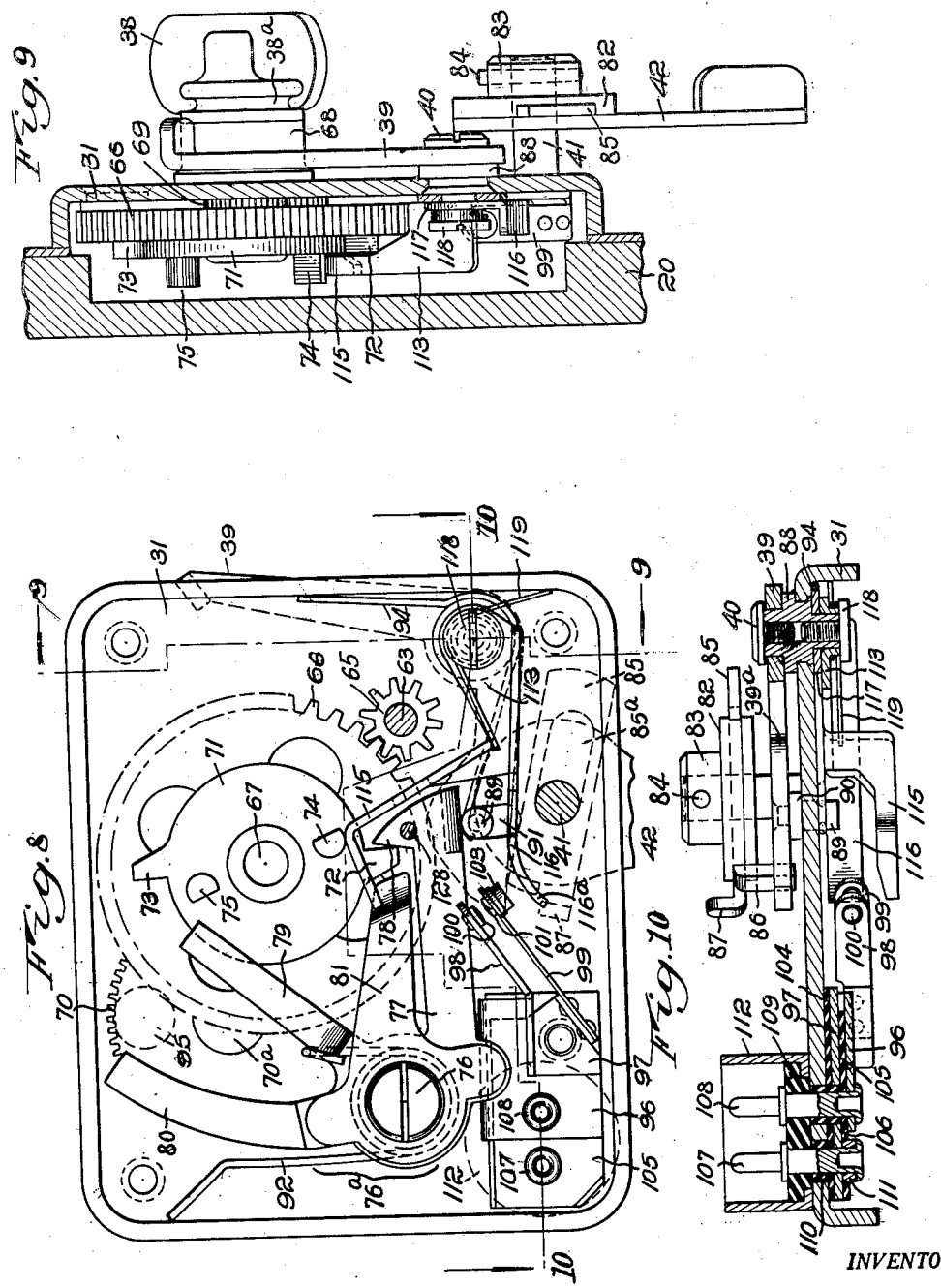

Patented Aug. 27, 1946

2,406,691

UNITED STATES PATENT OFFICE 2,406,691

CAMERA AND LIGHT SYNCHRONIZER

Irving Jacobson, Hollywood, Calif., and Harold E. Smith, Rochester, N. Y., assignors to Graflex, Inc., Rochester, N. Y., a corporation of Delaware Application May 6, 1944, Serial No. 534,396

16 Claims. (Cl. 67—29)

This invention relates to a new and improved synchronizer for synchronizing a photoflash lamp with a focal-plane shutter when used in a reflex camera.

In order that the principle of the invention may be readily understood, we have disclosed a single embodiment thereof in the accompanying drawings, wherein Fig. 1 is a left-hand side elevation of the camera, viewing Fig. 2, showing the mounting of the shutter plate containing the synchronizer contacts and the mounting of a battery case and reflector upon the camera;

Fig. 2 is a front elevation of Fig. 1;

Fig. 3 is a view similar to Fig. 1, but upon a larger scale and having certain parts shown in dotted or broken lines to indicate their position in the camera, a circuit diagram from the shutter plate to the flashlamp being also shown;

Fig. 4 is a view of the shutter plate removed from the camera and viewed from the camera side, the shutter being in condition ready for making an exposure;

Fig. 5 is a view similar to Fig. 4 but with the mirror frame released, thus releasing the shutter mechanism for making an exposure, the contacts of the synchronizer mechanism being shown in closed condition;

Fig. 6 is an enlarged fragmentary detail, partly in section, of the contact members;

Fig. 7 is a detail of the interlock member for controlling the operation of the synchronizer contacts;

Fig. 8 is a view similar to Fig. 5, but showing the shutter mechanism at the completion of an exposure, the mirror frame not yet having been reset;

Fig. 9 is a vertical section through Fig. 8 on the line 9—9 thereof, showing the position of the various parts of the shutter mechanism; and Fig. 10 is a transverse section through Fig. 8 on the line 10—10 thereof, showing the construction of the synchronizer contacts and the synchronizer receptacle.

One of the objects of this invention is to provide a synchronizer that will synchronize lamps of the short ignition period, namely, in the neighborhood of five milliseconds. Other objects of the invention are to control such synchronization by the shutter mechanism, to interlock the synchronizer circuit through the operation of the mirror frame, to prevent the inadvertent flashing of a lamp when rewinding the shutter or changing the shutter aperture, and to provide a synchronizer for synchronizing a photoflash lamp with the shutter when the shutter is set for a so-called one-fifth of a second exposure; while still other and important objects will be apparent from the ensuing description of the disclosed embodiment of the invention.

Referring to Figs. 1 and 2, the camera body is designated generally at 20 and is provided with a hinge cover 21, a handle 22, a focusing hood 23, a bellows 24, a lens shade 25, a sensitized material holder 26, a focusing knob 27, a lens board 28, a lens 29 and a cover catch 30, a shutter plate 31 and a tension plate 32 provided with a tension knob 33, a tension release button 34 and a tension indicator 35. All these parts may be of usual or any other suitable construction.

The tension plate 32 is attached to the camera body 20 by means of screws 36, 36, and the plate 31 is attached to the camera body by means of screws 37, 37. The shutter plate 31 is provided with a shutter rewind knob 38 having a hub 38a and a release lever 39 having a horizontal arm 39a and attached to the said shutter plate 31 by means of a screw 40. Passing through the shutter plate 31 is a shaft 41 to which is attached a mirror reset lever 42. To the camera body 20 a battery case 43 is attached by means of a clamp 44 fastened to a bracket 45 that is itself attached to said camera body 20 by means of screws 46, 46. Also attached to the battery case 43 or made a part thereof is a reflector 47 having a socket 48 which receives the flashlamp 49. The said battery case is preferably of a structure substantially the same as the battery case disclosed in the United States patent to Oscar Steiner, No. 2,293,477, dated August 18, 1942, but any similar battery case having an outlet known as a series outlet can be used instead.

Now referring to Fig. 3, which is a view similar to Fig. 1, but on a larger scale and wherein the mirror frame 50 is shown in dotted lines, such mirror frame 50 is pivoted on said shaft 41 which passes through the shutter plate 31 and through the mirror frame 50 and terminates in a suitable bearing on the opposite side of the camera. The said mirror frame 50 is caused to be moved in a contraclockwise direction by means of a spring (not shown). On the right-hand side of the camera, viewing Fig. 2 and as clearly shown in dotted lines, Fig. 3, is a mirror release lever support plate 51 securely held to the camera body 20 by screws 52, 52 and pivoted to said plate 51 is a mirror release lever 53 by means of a shoulder rivet 54. The said mirror release lever 53 is caused to be moved in a contraclockwise direction by a spring 55 so that a projection 56 of the said mirror release lever 53 will engage the lower edge of the mirror frame 50 when it is in the position shown in Fig. 3. When the handle portion 57 of said release lever 53 is moved in a downward or clockwise direction, the mirror frame 50 will be released and will be caused to be moved in an upward direction by reason of the mirror frame spring, previously referred to.

The tension plate 32 is provided with a bearing 58 into which a shaft (not shown) is fitted. The said shaft passes through the curtain shutter tension roller 59, shown in dotted lines in Fig. 3. Desirably the said tension roller is of well-known construction and needs no further description.

Carried upon the said curtain shutter tension roller 59 is a shutter curtain 60 that passes over an idler 61, shown in dotted lines in Fig. 3, and across the back of the camera body onto the shutter take-up roller 62, shown in dotted lines in Fig. 3, such take-up roller being provided with a shaft 63, shown in Fig. 3 and in section in Figs. 4, 5 and 8. One end of the said shaft 63 is carried by a bearing 64 attached to the shutter plate 31 and the opposite end of said shaft 63 is carried by a suitable bearing (not shown) attached to the right-hand side of the camera body.

Referring now to Figs. 4 to 10, there is attached to the said shaft 63 in any suitable manner a pinion 65 meshing with the shutter rewind gear 66, shown most clearly in Figs. 4, 5 and 8 and in dotted lines in Fig. 3. The said shutter rewind gear is provided with a shaft 67 passing through a bearing 68, best shown in Fig. 9, and which is securely attached to the shutter cover 31. Also fitted to the shaft 67 is a pinion 69 meshing with a shutter indicating gear 70, such pinion and gear being shown in full lines in Fig. 9, in full and dotted lines in Fig. 4, and in dotted lines in Fig. 3 as mounted on a stub shaft 70a. Also attached to the shaft 67 and to the gear 66 is a dog plate 71 having dogs 72, 73, such dog plate being attached to the rewind gear 66 by stop pins 74, 75 having reduced diameters passing through the said dog plate and gear 66, the opposite ends of such stop pins being riveted over so as securely to hold the said dog plate to the gear 66.

Pivoted upon a shoulder screw 76, best shown in Figs. 4, 5 and 8, is a three-pronged lever 76a that serves as or constitutes an escapement and is made up of a first arm 77 having a hook 78, a second arm 79, and a slightly curved third arm 80, which latter arm serves to hold the gear 70 to its stub shaft 70a. The second arm 79 engages the pin 74 or pin 75, whichever one happens to be in position for such engagement, for holding the shutter curtain in the set condition, and the hook 78 of the first arm 77 engages the dog 72 or dog 73, depending upon the rotative position of the dog plate 71. The manner of operation of the said parts will be subsequently more fully described.

Attached to the escapement lever 76a is a spring finger 81, the purpose whereof is to prevent the rewinding of the shutter curtain at any other than the proper time, and the manner in which this is effected will be presently fully described.

Attached to the shaft 41 carrying the mirror reset lever 42, most clearly shown in Figs. 9 and 10, is a disk 82 having a hub 83 securely held to the shaft 41 by a pin 84. To the said disk 82 is suitably attached in any desired manner, as by means of rivets 82a, 82a, the mirror or mirror-frame reset lever 42, previously referred to. As best shown in Figs. 8 and 10 and in end view in Fig. 9, passing through a slot in said disk 82 is a longitudinally slidable shutter release bar 85 having an inwardly-turned member or projection 86, shown best in Fig. 10 and in dotted lines in Figs. 4 and 5, which member or projection is for the purpose of engaging the shutter release lever 39. The said shutter release bar 85 is also provided, as shown in Fig. 10, with an outwardly extending formation 87 to permit the operator to manipulate the shutter release bar 85 by sliding it lengthwise, so as to allow the mirror frame 50 to move upward to horizontal position without operating the shutter curtain, because the inwardly turned member or projection 86 of the said shutter release bar 85 will, when the said bar is slid, be displaced in a left-hand direction viewing Fig. 10, so that the shutter release lever 39 will not be engaged. The said shutter release bar 85 is provided with an elongated opening 85a to clear the shaft 41 and to limit the movement of such bar 85, as clearly indicated in dotted lines in Figs. 4, 5 and 8.

The shutter release lever 39 is carried on a bushing 88, shown in Figs. 9 and 10, which is securely attached to the shutter housing 31 and the shutter release lever 39 is held in place by the screw 40. As most clearly shown in Figs. 8 and 10, there is attached to the lower arm 39a of the shutter release lever 39, a pin 89 having a shoulder 90 passing through an opening 91 in the outer wall of the shutter plate 31. The escapement lever 76a made up, as stated, of the lever arms 77, 79 and 80 is caused to be turned in a clockwise direction viewing Fig. 4 by means of a spring 92, best shown in Figs. 4, 5 and 8, and its motion in a clockwise direction is limited by the pin 89, best shown in Figs. 4 and 5. The shutter release lever 39 is caused to be turned in a clockwise direction, viewing Fig. 3, by a spring 94, best shown in Figs. 4 and 5, one end of such spring engaging a side wall of the shutter housing 31 and the opposite end thereof engaging the said pin 89.

We will now describe the operation of the camera in sufficient detail to make clear the requirements of the synchronizing mechanism yet to be described.

The camera herein disclosed is equipped with the said mirror frame 50 carrying the usual mirror for reflecting the image to the ground glass for focusing. When the mirror frame 50 is in its normal position, as shown in dotted lines in Fig. 3, all light is cut off from the sensitized material carried in the sensitized material holder 26, even though a curtain aperture is before (that is, in front of) the sensitized material. This makes it possible, without exposing such sensitized material, to rewind the shutter for making the second exposure or for changing the exposure aperture.

The camera is equipped with the usual multiple-aperture focal-plane shutter, indicated at 60, and is wound on the tension roller 59, the opposite or upper end of said shutter curtain being wound on the shutter curtain take-up roller 62. The said shutter curtain 60 is, in the disclosed embodiment, equipped with five separate different-sized apertures, thus making it possible to obtain many different shutter speeds, and further to increase the number of shutter speeds, the tension on the tension roller 59 is variable through the operation of the tension knob 33. The particular tension to which the tension knob 33 is set, is indicated in the window 35 of the tension plate 32. The shutter rewind handle 38 can be turned a sufficient distance in a contraclockwise direction to wind substantially all of the shutter curtain onto the take-up roller 62. When the shutter curtain is in such wound-up condition, the narrowest aperture thereof is in position for making an exposure, and the shutter speed or curtain aperture will be indicated in the window 95 of the shutter plate 31. The shutter curtain can be let down through the manipulation of the shutter release lever 39 so that other shutter curtain apertures will be in the position for making an exposure, and the selected aperture will be indicated in the window 95.

Another type of exposure, and one with which this invention is particularly concerned, is called the "one-fifth of a second exposure." Such type of exposure is accomplished by having the shutter curtain so wound that the wide-open aperture thereof will be in place before (that is, in front of) the sensitized material, and this fact will be indicated in the window 95, shown in Fig. 3. The exposure is made by first releasing the mirror frame 50 through the mirror release lever 57, Fig. 3. The said mirror frame 50 thereupon moves upward, allowing the light to pass through the lens to the sensitized material, but as the mirror reaches the top of its stroke or horizontal position, the shutter curtain 60 will be released and allowed to close, thus completing the exposure. The flash bulb in this type of exposure should be ignited just after the shutter curtain 60 starts to close. The exposure termed the "one-fifth of a second exposure" is actually timed by the length of flash or duration of flash of the flashlamp.

When the camera is used for normal instantaneous exposure, an aperture other than the full opening is used, and the sensitized material remains covered until the mirror frame 50 reaches the end of its stroke, at which time the shutter curtain is released and travels across the exposure opening, thus making the exposure. The shutter curtain cannot again be rewound until the mirror frame 50 is set in the position indicated in Fig. 3.

The mechanism for accomplishing the above described operation is as follows:

Referring first to Fig. 4, it will be assumed that the shutter curtain has been wound up on the rewind roller 62 and that an exposure aperture is in place or positioned for permitting an exposure, which aperture will be indicated in the window 95. The shutter curtain rewind roller 62 will be prevented from running down because the pinion 65 meshing with the gear 66 will be prevented from turning due to the fact that the stop pin 74 engages the arm 79 of the shutter escapement lever 76a. As the mirror frame 50, indicated in Fig. 3, is released by movement of the lever 57 previously described, the said mirror frame will be caused to swing upward through the action of the spring provided for that purpose and said mirror frame in swinging upward will cause to move with it the shaft 41, the disk 82 and the shutter release bar 85. When said mirror frame 50 reaches a point just anterior to the end of its travel, the inwardly extending end, member or projection 86 of said shutter release bar 85 will engage the horizontal arm 39a of the shutter release lever 39, causing it to be moved in a clockwise direction viewing Fig. 4, carrying with it the pin 89 on said arm 39a, and that passes through a suitable opening in the plate 31 and engages the first arm 77 of the three-pronged escapement lever 76a, causing it to be turned in a contraclockwise direction, thus withdrawing the second arm 79 thereof from the face of the stop pin 74, allowing the gear 66 to turn in a contraclockwise direction until the dog 72 of the dog plate 71 is engaged by the hook 78 of the first arm 77 of said three-pronged escapement lever 76a. The shutter will now be stopped or held from further travel and will be in the position or condition shown in Fig. 8, wherein the mirror is in the fully-up or horizontal condition and the dog 72 is engaged by the hook 78 of the said first arm 77 of said escapement lever 76a.

As the shutter rewind gear 66 turns contraclockwise sufficiently to cause the dog 72 of the dog plate 71 to be engaged by the hook 78 of the first arm 77 of the escapement lever 76a, said dog 72 will pass under the spring member 81 of the escapement lever 76a and will cause such spring member 81 to be deflected a sufficient distance outwardly, viewing Figs. 4, 5 and 9, to permit the dog 72 to pass under the spring finger 81, and after said dog 72 has passed under the end of the spring finger 81, such spring finger 81 will return to its normal position, thereby preventing the dog plate 71 and the shutter rewind gear 66 from being turned in either direction so long as the mirror frame 50 is held in the up or horizontal position. When the mirror frame 50 is reset through manipulation of the mirror reset lever 42, the horizontal arm 39a of the shutter release lever 39 will be caused to be moved in a contraclockwise direction because of the engagement of the spring 94 with the pin 89, and the escapement lever 76a with its arms 77, 79 and 80 will be caused to turn in a clockwise direction under the influence of spring 92, thus withdrawing the hook 78 of arm 79 from the dog 73 and allowing the shutter rewind gear 66 to turn slightly until the stop pin 75 is engaged by the said second arm 79 of the escapement lever 76a.

The exposure of the sensitized material will have been made in the cycle just referred to, and if the mirror frame 50 is again released, an exposure of a different time length will be made because a different aperture will now be in place. If, however, the same type of exposure is desired as that just made, it is necessary to rewind the shutter curtain until the stop pin 74 is again engaged by the second lever arm 79 of the escapement lever 76a. The shutter will thereupon be in condition for making an exposure precisely the same as the just preceding exposure. Any curtain aperture can be selected for making the different types of exposure either by winding the shutter rewind knob 38 or through allowing the shutter curtain to run down while the mirror is in the set condition, by suitable manipulation of the shutter release lever 39. Thus any particular aperture that is desired can be selected and such selected aperture will be indicated through the window 95. The shutter indicating gear 70 meshing with the pinion 68 is of sufficient size to make less than one revolution during the complete run-down of the shutter curtain, so that the said gear 70 carries the several markings indicating the various shutter speeds or shutter apertures.

The shutter mechanism thus far described constitutes one selected embodiment or structure with which cooperate the features to which our invention is more particularly concerned, and which we will now describe, but other suitable cooperating embodiments or structures of shutter mechanism may be employed instead.

Referring now to Figs. 4 to 10, there are attached to the shutter plate 31 a contact member 96 and a contact member 97, the former being provided with an inclined projecting arm 98 and the latter being provided with an inclined projecting spring arm 99, said arms being shown separately in Fig. 6. To the contact arm 98 is attached a contact point 100, and to the contact spring arm 99 is attached a contact point 101, and also a metallic cup 102 into which is fitted an insulated button 103. As best shown in Fig. 10, the contact member 97 is insulated from the shutter plate 31 by an insulating strip 104, and the said contact members 97 and 96 are insulated from each other by an insulating strip 105 and an insulating bushing 106. Such contact members 96 and 97 and the insulating strips 104 and 105 are held to the shutter plate 31 by means of the contact studs 107 and 108 and the insulating washer 109. The contact stud 108 passes through the insulating washer 109 and through the insulating bushing 106 and is riveted over the contact member 96, being electrically connected thereto. The contact stud 107 passes through the insulating washer 109, through an insulating bushing 110, through the insulating member 104, contact member 97 and washer 111, being riveted over onto said washer 111, thereby securely holding the contact member 97 to the shutter plate 31 and making contact with the said member 97 through said washer 111. As best shown in Fig. 10, the insulating washer 109 also serves to hold a cylindrically shaped member 112 constituting a receptacle for a connecting plug, to be referred to.

Pivoted onto the bushing 88 is an interlock member, indicated generally at 113 and shown separately in Fig. 7, which is provided with a bushing 114, an upper arm 115 having a right-angle bend and a lower arm 116 having a curved end 116a. Separating the said interlock member 113 from the shutter plate 31 is a washer 117, shown in Figs. 9 and 10, against which the said interlock member 113 rides, such washer being held in place on the bushing 88 by a large head screw 118. The said interlock member 113 is caused to be rotated in a clockwise direction by a spring 119. The purpose of the interlock member is to control the operation of the synchronizer contacts and to effect the closing of such contacts at the proper time.

The battery case 43 is connected to the contact studs 107, 108 through a cable 120, one end of which has a plug 121 for plugging into the series receptacle of the said battery case and the opposite end of the said cable has a plug 122, previously referred to in describing the cylindrically shaped member 112 on the shutter plate 31, being for the purpose of plugging into said receptacle.

For clearness of description and understanding, Fig. 3 contains a wiring diagram wherein the usual battery is indicated at 123, one end thereof being provided with a wire 124 that connects to one terminal of the flashlamp 49, the other terminal of such lamp having a wire 126 connected thereto and connected to the contact stud 107. The contact stud 108 has a wire 127 connecting the other side of the battery 123. If a circuit is closed between the contact studs 107, 108, current will flow through the flashlamp 49 and the battery 123, causing such flashlamp to be ignited. The operation of the synchronizer mechanism is as follows.

The shutter curtain rewind mechanism is shown in Fig. 4 as in readiness for making an exposure, and the battery case 43 and the bulb of the flashlamp 49 are connected as just described. The shutter curtain is set to the open condition as indicated in Fig. 3. The mirror release lever 53, shown in Fig. 3, is now depressed, releasing the mirror frame 50 which swings upward in a contraclockwise direction, viewing Fig. 3, turning with it the shaft 41, the disk 82 and the bar 85. The inwardly turned member or projection 86 of the said bar 85 will contact with the horizontal member 39a of the shutter release lever 39, carrying with it the pin 89 (Figs. 4, 5 and 8) which will cause the shutter escapement lever 76a to be turned in a contraclockwise direction viewing Figs. 4 and 5. It will be noted that up to this time the contact points 100 and 101 are in open condition.

The interlock member 113 will be caused to follow the said pin 89 because of the action of spring 119, thus tending to cause the said interlock member 113 to be turned in a clockwise direction. It is, however, prevented from doing so because the arm 115 of the said interlock member 113 is held from movement by the stop pin 75 as said interlock swings in a clockwise direction on bushing 114, but as the shutter rewind gear 66 starts to rotate, thereby moving the stop pin 75 out of the path of the arm 115 of the interlock member, such interlock member will be allowed to rotate, carrying with it the arm 116 which will contact with the insulating button 103 carried by the contact spring arm 99, thus causing the contact points 100 and 101 to be closed, thereby completing a circuit from the battery 123 to the flashlamp 49. As the shutter curtain is rewound for making a second exposure, the contact points 100 and 101 will remain open inasmuch as the shutter curtain cannot be rewound unless and until the mirror frame 50 has been returned to its set condition, shown in dotted lines in Fig. 3, because of the spring finger 81, Figs. 4, 5 and 8, attached as described to the escapement lever 76a and having an interlocking function with respect to the operation of the shutter curtain.

When the mirror frame 50 is in the set condition shown in dotted lines in Fig. 3, the arm 116 of the interlock member 113 is held in the position shown in Fig. 4. Therefore, the contact points 100 and 101 cannot be closed when the mirror frame 50 is in the said set condition.

In order that the structure and function of the interlock member 113 and its cooperation with the other parts of the mechanism may be entirely clear, we have in Fig. 4 shown the said interlock member in dotted lines in another position and have applied radial or like lines, arcs and arrows, and reference letters so as to make entirely clear the following description of the action.

Using the center of the bushing 114 as an axis a radial line A is drawn and the indicated arc A' is inscribed by the end thereof. Such arc passes exactly through the right-angle bend of the arm 115 and touches the pin 75, shown in Fig. 4. Such position of the pin 75 allows an extent of circumferential movement of the dog plate 71 to the dotted arrow line B, and the continuation of the arc A' shows that the lever arm 116 with end 116a does not make contact with the insulating button 103 until after the dog plate 71 starts to rotate.

The dotted line position of the interlock member 113 in Fig. 4 is that assumed when the mirror frame 50 has been released but the shutter rewind gear 66 has not yet started to turn. Therefore the contacts 100 and 101 will not be closed until the said shutter rewind gear 66 starts to rotate in a contraclockwise direction. This constitutes an important feature of the invention inasmuch as the closing of the contact 100, 101 is actually caused to occur by the rotation of the shutter rewind gear 66, but is prevented from occurring while the mirror frame 50 is in the set condition.

Thus we have provided a movable interlock member to close the contacts, the closing of the contacts being effected through movement of said interlock member, but such movement of the interlock member is prevented until the shutter rewind gear is permitted to turn in its shutter curtain releasing movement, that is, in a contraclockwise direction.

In order to permit of changing shutter curtain apertures through the act of allowing the shutter curtain to run down and without causing the contact points 100 and 101 to be closed, we have provided means for actuating the shutter escapement lever 76a, made up of lever arms 77, 79 and 80, without causing movement of the shutter release lever 39. This we accomplish through the provision of a shutter reset button 128 (Figs. 1, 4, 5 and 8) attached to the first arm 77 of the shutter escapement lever 76a, and extending through a slot or opening 129 in the shutter plate 31, as shown in Figs. 1 and 3. The said shutter escapement lever 76a can now be operated by the said shutter reset button 128, thus allowing the shutter curtain to be let down. Inasmuch, however, as the pin 89 is held in its downward position, as shown in Fig. 4, by means of the spring 94, the arm 116 of the interlock member 113 will also be held in the downward position, thus preventing the closing of the contact points 100 and 101.

Thus the shutter curtain may be wound to change a shutter aperture or to allow the shutter curtain to be run down to change the shutter aperture, without causing the flashlamp 49 to be ignited, and also preventing inadvertent flashing of such flashlamp if it is in place prior to making an exposure and when selecting any one of the several exposure apertures of the shutter curtain. But when the mirror frame 50 has been released and the shutter curtain starts to run down, the contacts will be made in the manner hereinbefore described, thus causing the flashlamp to be illuminated at the proper time for making an exposure. It will be noted, viewing Fig. 8, that when the shutter curtain is in the run-down condition and prior to the resetting of the mirror, the contacts 100 and 101 will be in open condition because interlock member 113 is held in an inoperative condition by the pin 74. Thus, if a lamp were placed in the socket when the shutter curtain is in this condition, it would not be ignited.

The synchronizing mechanism herein disclosed is adapted to be built into the standard Graflex cameras and provides accurate synchronization of flashlamps having a short period of illumination, with the employment of the Graflex shutter speed of one-fifth of a second. This capability makes possible the use of less expensive lamps for making satisfactory flash photographs with any reflex camera having a structure like or similar to that herein disclosed.

Having thus described one illustrative embodiment of the invention, it is to be understood that although specific terms are employed, they are used in a generic and descriptive sense and not for purposes of limitation, the scope of the invention being set forth in the following claims.

We claim:

1. A photographic camera of the reflex type having a containing casing to be opened and entirely closed, having a focal-plane shutter curtain with a rewind roller, having a mirror pivoted near the upper wall of the casing for swinging upward movement upon mirror release from focusing position into picture-taking position, and having means to release the shutter curtain by mirror movement to picture-taking position, said means to release the shutter curtain including a shutter release lever having a protruding pin-like formation, and an escapement lever adapted to be directly engaged and moved by said formation, said escapement lever being positioned to hold, until acted upon, said rewind roller from running down, electrically controlled photoflash means including a photoflash lamp and battery and an electrical circuit at least partially within said casing and including within the casing a switch with two contacts to be closed to complete the circuit to said lamp, and means released for action by the commencement of the running-down movement of the shutter rewind roller to close said contacts.

2. A photographic camera of the reflex type having a containing casing to be opened and entirely closed, having a focal-plane shutter curtain, having a mirror pivoted near the upper wall of the casing for swinging upward movement upon mirror release from focusing position into picture-taking position, and having means to release the shutter curtain by mirror movement to picture-taking position, said means to release the shutter curtain including a shutter release lever having a projecting pin-like formation, and an escapement lever having an arm adapted to be engaged by said formation and having another arm, and a shutter rewind gear and dog plate having stop pins to be engaged by said second arm and having dogs to be engaged by said first arm, electrically controlled photoflash means including a photoflash lamp and battery, and an electrical circuit at least partially within said casing and including within the casing a switch with two contacts to be closed to complete the circuit to said lamp, and means released for action by the commencement of the running-down movement of the said shutter rewind gear to close said contacts.

3. A photographic camera of the reflex type having a containing casing to be opened and entirely closed, having a focal-plane shutter curtain with a rewind roller, having a mirror pivoted near the upper wall of the casing for swinging upward movement upon mirror release from focusing position into picture-taking position, and having means to release the shutter curtain by mirror movement to picture-taking position, electrically controlled photoflash means including a photoflash lamp and battery, and an electrical circuit at least partially within said casing and including within the casing a switch with two synchronizer contacts to be closed to complete the circuit to said lamp, a shutter release lever and a movable interlock member controlling the operation of the synchronizer contacts and effecting the closing thereof at the proper time, the movement of said interlock member being controlled by movement of said shutter release lever and said interlock member upon its own movement acting to close said contacts.

4. A photographic camera of the reflex type having a containing casing to be opened and entirely closed, having a focal-plane shutter curtain with a rewind roller, having a mirror pivoted near the upper wall of the casing for swinging upward movement upon mirror release from focusing position into picture-taking position, and having means to release the shutter curtain by mirror movement to picture-taking position, said means to release the shutter curtain including a slidable bar 85 supported at the mirror pivot to move with the mirror and having a projection 86, a shutter release lever having an arm to be engaged by said projection 86, said shutter release lever having a pin 89, an escapement lever having an arm 77 to be engaged by said pin, electrically controlled photoflash means including a photoflash lamp and battery, and an electrical circuit at least partially within said casing and including within the casing a switch with two contacts to be closed to complete the circuit to said lamp, and means released for action by the commencement of the running-down movement of the said shutter rewind roller to close said contacts.

5. A photographic camera of the reflex type having a containing casing to be opened and entirely closed, having a focal-plane shutter curtain, having a mirror pivoted near the upper wall of the casing for swinging upward movement upon mirror release from focusing position into picture-taking position, and having means to release the shutter curtain by mirror movement to picture-taking position, said means to release the shutter curtain including a shutter release lever 39 having a pin 89, an escapement lever 76a having an arm 77 to be engaged by said pin 89, and a shutter rewind gear and dog plate having stop pins and dogs to be engaged by said escapement lever, electrically controlled photoflash means including a photoflash lamp and battery, and an electrical circuit at least partially within said casing and including within the casing a switch with two contacts to be closed to complete the circuit to said lamp, and means released for action by the commencement of the running-down movement of the said shutter rewind roller to close said contacts.

6. A photographic camera of the reflex type having a containing casing to be opened and entirely closed, having a focal-plane shutter curtain, having a mirror pivoted near the upper wall of the casing for swinging upward movement upon mirror release from focusing position into picture-taking position, and having means to release the shutter curtain by mirror movement to picture-taking position, said means to release the shutter curtain including a shutter release lever having a projecting pin 89, electrically controlled photoflash means including a photoflash lamp and battery, an electrical circuit at least partially within said casing and including within the casing a switch with two synchronizer contacts to be closed to complete the circuit to said lamp, and a movable interlock member controlling the operation of the said synchronizer contacts and effecting the closing thereof at the proper time, the movement of said interlock member being controlled by the movement of said pin 89.

7. A photographic camera of the reflex type having a containing casing to be opened and entirely closed, having a focal-plane shutter curtain, having a mirror pivoted near the upper wall of the casing for swinging upward movement upon mirror release from focusing position into picture-taking position, and having means to release the shutter curtain by mirror movement to picture-taking position, said means to release the shutter curtain including a shutter release lever having a projecting pin 89, an escapement lever having arms 77, 79, a shutter rewind gear with a dog plate having stop pins and dogs, electrically controlled photoflash means including a photoflash lamp and battery, an electrical circuit at least partially within said casing and including within the casing a switch with two synchronizer contacts to be closed to complete the circuit to said lamp, and a movable interlock member 113 controlling the operation of the said synchronizer contacts and effecting the closing thereof at the proper time, the movement of said interlock member being effected by engagement with said pin 89, said interlock member 113 having another arm engageable with a stop pin of the said shutter rewind gear and dog plate.

8. A photographic camera of the reflex type having a containing casing to be opened and entirely closed, having a focal-plane shutter curtain, having a mirror pivoted near the upper wall of the casing for swinging upward movement upon mirror release from focusing position into picture-taking position, and having means to release the shutter curtain by mirror movement to picture-taking position, said means to release the shutter curtain including a shutter release lever having a projecting pin 89, an escapement lever having a plurality of arms, one of which is adapted to be engaged and moved by said pin 89, a shutter rewind gear and a dog plate having stop pins and dogs, electrically controlled photoflash means including a photoflash lamp and battery, an electrical circuit at least partially within said casing and including within the casing a switch with two synchronizer contacts to be closed to complete the circuit to said lamp, and a pivoted interlock member 113 having a spring 118 to cause said interlock member to follow the movement of said pin 89, said interlock member also having an arm to engage a stop pin of said shutter rewind gear and dog plate, said interlock member controlling the position of the said synchronizer contacts and effecting the closing thereof at the proper time.

9. A photographic camera of the reflex type having a containing casing to be opened and entirely closed, having a focal-plane shutter curtain, having a mirror pivoted near the upper wall of the casing for swinging upward movement upon mirror release from focusing position into picture-taking position, and having means to release the shutter curtain by mirror movement to picture-taking position, said means to release the shutter curtain including electrically controlled photoflash means itself including a photoflash lamp and battery, an electrical circuit at least partially within said casing and including within the casing a switch with two synchronizer contacts to be closed to complete the circuit to said lamp, a movable interlock member controlling the operation of the said synchronizer contacts and effecting the closing thereof at the proper time, a shutter release lever controlling the movement of said interlock member, and a shutter rewind gear also controlling the movement of said interlock member.

10. A photographic camera of the reflex type having a containing casing to be opened and entirely closed, having a focal-plane shutter curtain, having a mirror pivoted near the upper wall of the casing for swinging upward movement upon mirror release from focusing position into picture-taking position, and having means to release the shutter curtain by mirror movement to picture-taking position, said means to release the shutter curtain including a shutter release lever, a shutter rewind gear, electrically controlled photoflash means including a photoflash lamp and battery, an electrical circuit at least partially within said casing and including within the casing a switch with two synchronizer contacts to be closed to complete the circuit to said lamp, and a movable interlock member having formations cooperating with both said shutter release member and shutter rewind gear, said interlock member controlling the operation of the said synchronizer contacts and effecting the closing thereof at the proper time.

11. A photographic camera of the reflex type having a containing casing to be opened and entirely closed, having a focal-plane shutter curtain, having a mirror pivoted near the upper wall of the casing for swinging upward movement upon mirror release from focusing position into picture-taking position, and having means to release the shutter curtain by mirror movement to picture-taking position, said means to release the shutter curtain including a shutter release lever having a projecting pin 89, a shutter rewind gear and dog plate having stop pins and dogs, an escapement lever having a plurality of arms to engage respectively said stop pins and dogs, electrically controlled photoflash means including a photoflash lamp and battery, an electrical circuit at least partially within said casing and including within the casing a switch with two synchronizer contacts to be closed to complete the circuit to said lamp, and a movable interlock member having formations engaging the projecting pin 89 of the release lever and a dog or dogs of such shutter rewind gear, said interlock member controlling the operation of the said synchronizer contacts and effecting the closing thereof at the proper time.

12. A photographic camera of the reflex type in accordance with claim 5, but wherein the camera casing has contact plates 96, 97 with projecting spring arms 98, 99 respectively, said arm 99 having a metallic cup 102 with an insulating button 103, and means for suitably insulating said plates 96, 97 including an insulating strip 104 to insulate member 97, a strip 105 and bushing 106 to insulate said members 96, 97 from each other.

13. A photographic camera of the reflex type having a containing casing to be opened and entirely closed, having a focal-plane shutter curtain, having a mirror pivoted near the upper wall of the casing for swinging upward movement upon mirror release from focusing position into picture-taking position, and having means to release the shutter curtain by mirror movement to picture-taking position, electrically controlled photoflash means including a photoflash lamp and battery, an electrical circuit at least partially within said casing and including within the casing a switch with two synchronizer contacts to be closed to complete the circuit to said lamp, a movable interlock member controlling the operation of the said synchronizer contacts and effecting the closing thereof at the proper time, and shutter release means and shutter rewind means both engaging said interlock member, the shutter release means controlling the movement of the said interlock member and the said shutter rewind means by its movement permitting movement of said interlock member.

14. A photographic camera of the reflex type in accordance with claim 1, but wherein the escapement lever is provided with a spring finger 81 to prevent rewinding of the shutter curtain until the mirror frame is in set position.

15. A photographic camera of the reflex type having a containing casing to be opened and entirely closed, having a focal-plane shutter curtain, having a mirror pivoted near the upper wall of the casing for swinging upward movement upon mirror release from focusing position into picture taking position, and having means to release the shutter curtain by mirror movement to picture-taking position, said means to release the shutter curtain including a shutter release lever having a projecting pin-like formation, and an escapement lever having an arm adapted to be engaged by said formation and having another arm, and a shutter rewind gear and dog plate having stop pins to be engaged by said second arm and having dogs to be engaged by said first arm, electrically controlled photoflash means including a photoflash lamp and battery, and an electrical circuit at least partially within said casing and including within the casing a switch with two contacts to be closed to complete the circuit to said lamp, and means controlled by said shutter release lever to close said contacts, one of the arms of said escapement lever having a formation extending through a suitable opening in the wall of the camera casing, so as to be accessible for manual manipulation, for moving said escapement lever, thereby to permit changing the curtain position without closing the contacts.

16. A photographic camera in accordance with claim 5, but wherein the lever arm 77 is provided with a pin 128 extending through a suitable slot in the camera casing, for manual manipulation, to permit changing the shutter curtain position without closing said contacts.

IRVING JACOBSON.
HAROLD E. SMITH.